Oct. 20, 1942.   M. B. AUSTIN, JR   2,299,674
RECEPTACLE AND MOUNTING THEREFOR
Filed Jan. 4, 1940
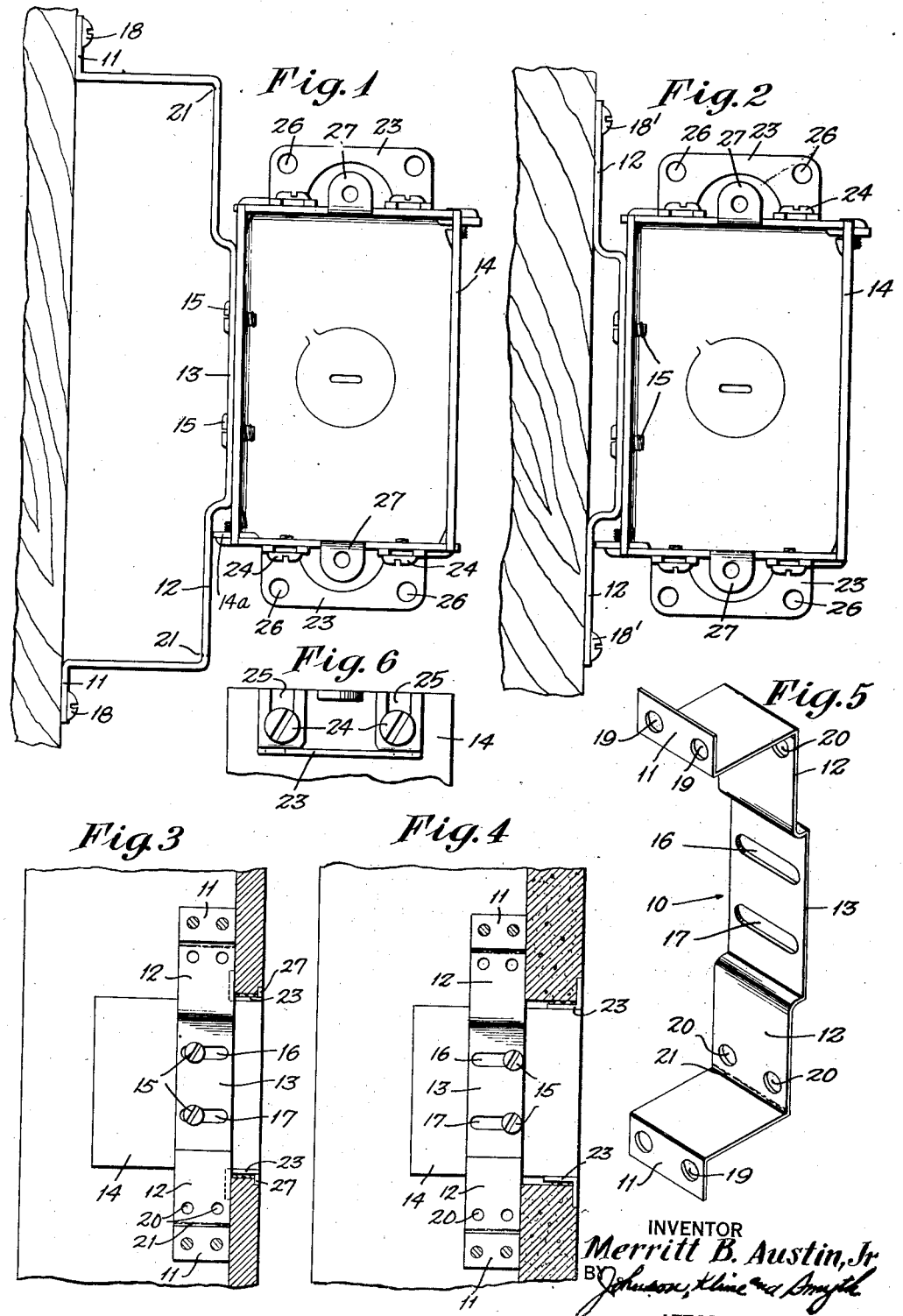
INVENTOR
Merritt B. Austin, Jr.
BY Johnson, Kline and Smyth
ATTORNEYS Patented Oct. 20, 1942

2,299,674

UNITED STATES PATENT OFFICE 2,299,674

RECEPTACLE AND MOUNTING THEREFOR

Merritt B. Austin, Jr., Winnetka, Ill.

Application January 4, 1940, Serial No. 312,326

4 Claims. (Cl. 248—311)

The present invention relates to means for mounting an outlet receptacle.

In prior constructions, brackets have been provided for attaching outlet receptacles to studs in walls. However, these brackets have been secured rigidly to the outlet receptacle so that in cases where different wall materials have been used it has been necessary to completely remove the bracket and replace it on the stud, if possible, or to completely replace the bracket and outlet with another which will accommodate the wall material. For example, when Celotex or similar wall board is used, the outlet box must extend for a substantial distance beyond the bracket in order to be substantially flush with the wall, while, on the other hand, if beaverboard or the like composition is used, the outlet receptacle projects but slightly beyond the bracket to be flush with the wall.

Again, in various installations, it is, at times, desirable to space the outlet box at different distances from the stud. This may be caused by the necessity of providing supporting strips along the stud to reinforce the wall material, or to space the outlet so that it will be more readily accessible.

An object of the present invention is to provide an attaching bracket for receptacles which will be operative to mount the receptacle for use with various wall coverings and at the desired distance from the studding.

In the preferred form of the invention, the bracket is formed with transversely extending slots which provide for adjustments to accommodate various thicknesses of wall material and the bracket itself is provided with a double-stepped portion to provide for mounting it to the stud at different distances therefrom.

If it is desired to mount the outlet a substantial distance from the stud, the full double-stepped bracket is used. If it is desired, however, to place the outlet receptacle close to the stud, then the other stepped portion is used for this purpose.

A feature of the present invention is the provision of a frangible connection between the two stepped portions, whereby the first stepped portion can be readily removed from the bracket if desired.

Another feature of the invention is the adjustable backing plate which is positioned on the outlet to engage the wall material. This can be adjusted on the outlet for various thicknesses of material so that it engages the front surface of the wall to which it is secured, or the rear surface of the wall to support the same. In each instance it will maintain the outlet in its flush relation with the surfaces of the wall.

Other features and advantages of the invention will be apparent from the specification and claims when considered in connection with the drawing, in which:

Figure 1 shows the bracket, of the present invention, mounting the outlet box at a substantial distance from the studding.

Fig. 2 shows the bracket mounting the outlet box close to the studding.

Fig. 3 shows the outlet box when used in connection with the beaverboard or the like composition material.

Fig. 4 shows the bracket mounting the outlet box for use with Celotex or the like thick wall material.

Fig. 5 shows a perspective view of the bracket.

Fig. 6 is a top view showing the attaching plate mounted on the box.

As shown in Figs. 1 and 5 of the drawing, the bracket comprises a substantially U-shaped member 10, each leg having two stepped portions 11 and 12 thereon with the center 13 of the U offset slightly from the last stepped portion. An outlet receptacle 14, which is to be mounted by the bracket, is secured on this offset portion by means of screws 15 passing through a pair of apertures 16, 17 in the bracket and threaded into the receptacle, the offset being sufficient to receive the heads of the screws so that they will not interfere when the stepped portion 12 is employed to mount the receptacle. The offset portion also provides sufficient space to receive the lip 14a, as shown in Figs. 1 and 2, through which the screw passes that holds the removable side of the switch box in place as is common in the art.

When it is desired to mount the receptacle at a substantial distance from the stud, as shown in Figure 1, the stepped portion 11 of the bracket is secured to the stud by means of screws 18 passing through apertures 19 therein. It will be seen, therefore, that this effectively spaces the receptacle at the desired distance from the stud.

On the other hand, I have found that, in some situations, it is highly desirable that the receptacle be mounted close to the stud in the manner shown in Fig. 2. This is accomplished, according to my novel bracket, by utilizing the second step 12 of the stepped bracket for this purpose, and securing it directly to the stud by means of screws 18' passing through apertures 20 adjacent the ends thereof.

In order that this might be accomplished, the bracket 10 is provided with a weakened line of frangible connection adjacent each end of the second step, as indicated at 21 in Figs. 1 and 5, which can be broken by the application of force thereto to bend the bracket along this line. Thus, it is merely necessary to break the frangible connection and remove the first stepped portion to obtain a bracket for mounting the receptacle adjacent the stud.

So far, I have been considering merely the mounting of the receptacle with respect to its position toward or away from the stud. However, the device of the present invention has an additional feature in that the receptacle can be adjusted on the bracket laterally, that is, forwardly and rearwardly with respect to the wall so that thin wall board constructions, of beaverboard, thin plasterboard, or the like, such as shown in Fig. 3, or thicker board, as Celotex or the like, as shown in Fig. 4, can be used.

In the preferred form of the invention, this is achieved by elongating the apertures 16, 17 in the portion 12 of the bracket through which screws 15 pass. By loosening the screws, the receptacle can be moved to the positions shown in Figs. 3 or 4, so that it is flush with the wall board. If, for example, for some reason it becomes necessary to use a thicker material, after the brackets are secured, such as Celotex, or the like, the screws can be loosened and the box adjusted outwardly until it becomes flush with the outer surface of the Celotex covering and the receptacle locked in place.

In order to further hold the box in position, an adjustable plate 23 is mounted at the top and bottom thereof. Each plate is secured thereto by screws 24 operating in slots 25 thereon. The plate can be adjusted for various widths of the wall board so as to engage the rear surface thereof to support the same, as indicated in Fig. 3, against inward movement, or, if desired, it can be reversed so as to engage the outer surface of the wall material, as shown in Fig. 4, to which it is secured by securing means passing through apertures 26 in the plate. When in the position shown in Fig. 3, the plate may also clamp the wall against the back of a lug 27 on the receptacle to which the switch or the like is secured.

From the foregoing, it will be seen that I have provided a novel bracket for mounting receptacle at various distances from the studs to which they are mounted, and also enables the receptacle to be mounted for use with various thickness of wall material.

In the broader aspects of the invention if it is not desired to have the box adjustable on the bracket, the bracket of the present invention, having two stepped portions, can be formed integrally with the side wall or secured thereto. In such case, the adjustable attaching plates 23 may or may not be provided. Further, while the slots have been shown as extending transversely of the bracket, it is to be understood that they can extend longitudinally of the bracket to accommodate for adjustment of the receptacle relative to the bracket in that direction.

Variations and modifications may be made within the scope of this invention and portions of the improvements may be used without others.

I claim:

1. A mounting for an electrical outlet receptacle of the type described comprising means for adjustably mounting the receptacle on a support, including a bracket secured to the side of the receptacle for lateral adjustment with respect thereto and having a plurality of supporting sections having support-engaging faces parallel with the side of the receptacle and spaced at different distances from the side of the receptacle for selectively positioning the receptacle at different distances from the support, said bracket being separable between the plurality of supporting sections whereby those sections farther away from the side of the receptacle than the selected section can be removed, each of said supporting sections being provided with means whereby the section may be secured to the support.

2. A bracket of the type described comprising a strap having two supporting portions in stepped relation, each portion being provided with means whereby the portion may be secured to a support, said strap being provided with a frangible connection between the portions whereby the portions can be removed and the bracket selectively connected to a support and an offset portion for connection to an outlet receptacle, the stepped supporting portions being at different distances from the receptacle and the offset portion having elongate apertures extending transversely thereof and through which the connection to the outlet box is made, whereby the receptacle can be mounted at different distances from the support and in different positions laterally of the support.

3. A bracket of the type described comprising a U-shaped member having an outlet-engaging portion in the bow of the U for connection to an outlet receptacle, the legs of the U each having two supporting portions in stepped relation and spaced at different distances from the bow of the U and having a frangible connection adjacent the outer end of the supporting portion adjacent the receptacle whereby the part of the leg having the other supporting portion can be removed and the outlet receptacle secured closer to the support.

4. A bracket of the type described comprising a strap having two flat supporting portions and an offset portion for connection to an outlet receptacle, the flat supporting portions being in stepped relation and in parallel planes at different distances from the receptacle and each having means whereby the supporting portion may be secured to the support, the bracket having means between supporting portions whereby the bracket may be readily severed, and the offset portion having elongate apertures extending transversely thereof and through which the connection to the outlet box is made for lateral adjustments thereof, whereby the receptacle can be mounted at different distances from the support and in different positions laterally of the support.

MERRITT B. AUSTIN, Jr.